(12) United States Patent
Inoue et al.

(10) Patent No.: US 7,520,432 B2
(45) Date of Patent: Apr. 21, 2009

(54) SENSOR SYSTEM

(75) Inventors: Hiroyuki Inoue, Kyoto (JP); Hitoshi Oba, Fukuchiyama (JP); Koji Shimada, Fukuchiyama (JP); Toru Hosoda, Ayabe (JP); Naoya Nakashita, Ayabe (JP); Hajime Takegawa, Fukuchiyama (JP); Kenji Horie, Ayabe (JP); Takeshi Yoshiura, Ayabe (JP); Mai Miyawaki, Fukuchiyama (JP)

(73) Assignee: Omron Corporation, Kyoto-Shi (JP)

( * ) Notice: Subject to any disclaimer, the term of this patent is extended or adjusted under 35 U.S.C. 154(b) by 529 days.

(21) Appl. No.: 11/215,124

(22) Filed: Aug. 31, 2005

(65) Prior Publication Data
US 2006/0060650 A1 Mar. 23, 2006

(30) Foreign Application Priority Data
Aug. 31, 2004 (JP) ............................ P2004-253504

(51) Int. Cl.
*G06K 7/00* (2006.01)
(52) U.S. Cl. ...................... 235/454; 235/435; 235/440
(58) Field of Classification Search ................ 235/439, 235/440, 435, 454, 492
See application file for complete search history.

(56) References Cited

U.S. PATENT DOCUMENTS 6,343,740 B1 * 2/2002 Ju et al. ...................... 235/454
6,726,103 B1 * 4/2004 Motta et al. ................. 235/454

FOREIGN PATENT DOCUMENTS

JP 2004-234437 8/2004

* cited by examiner

*Primary Examiner*—Seung H Lee
(74) *Attorney, Agent, or Firm*—Foley & Lardner LLP

(57) ABSTRACT

To enables realization of an image data collection function, a bank switch function and the like at low cost in a juxtaposedly placed type sensor system for handling an image, such as a visual sensor or a displacement sensor, by introduction of the minimum required number of new units into an existing system.

A first operation of storing image data acquired by a sensor controller from a sensor head and/or measurement data obtained by processing the image data, into a non-volatile record medium of a data storage unit, and/or a second operation of writing the setting data having been stored into the non-volatile record medium of the data storage unit, on a bank memory inside the sensor controller unit, are made possible.

10 Claims, 16 Drawing Sheets

A  Memory map of double buffer

B  Double buffer process

Fig. 16

|         | P1 | P2 | P3 |
|---------|----|----|----|
| Group 1 | 40 | 30 | 20 |
| Group 2 | 20 | 50 | 60 |
| Group 3 | 35 | 40 | 50 |
| Group 4 | 25 | 45 | 55 |
| ⋮ | ⋮ | ⋮ | ⋮ |

SENSOR SYSTEM

BACKGROUND OF THE INVENTION

1. Field of the Invention

The present invention relates to a juxtaposedly placed type sensor system for handling an image, such as a visual sensor or a displacement sensor, and particularly to a sensor system that can realize an image data correction function, a bank switch function and the like at low cost by introduction of the minimum required number of new units into an existing system.

2. Description of the Related Art

As a conventional data collection system, the following system is known: data of an event device is stored into a collection data storage part as event history data when the data of the event device is changed, and an event focus file, containing data of a collection device before/after occurrence of an event, is created and then stored into a memory card (c.f. Japanese Patent Laid-Open No. 2004-234437).

However, data handled by the foregoing data collection system is output data itself from a sensor, such as on-off data. Such data is not data inside a sensor which occurs in an on-off data generation process, and naturally, collection of image data is not at all intended. Hence it is not possible to introduce such data collection system as it is into a juxtaposedly placed type sensor system for handling an image, such as a visual sensor and a disposition sensor.

SUMMARY OF THE INVENTION

This invention was made in view of the foregoing technical background, and has an object that, in a juxtaposedly placed type sensor system for handling an image, such as a visual sensor or a disposition sensor, a sensor system is provided which can realize an image data collection function, a bank switch function and the like at low cost by introduction of the minimum required number of new units into an existing system.

In a sensor system of this invention, one data storage unit and one or more than one sensor controller units is detachably juxtaposedly placed. Those units in the juxtaposedly placed state are connected to one another via a parallel data bus. A versatile non-volatile record medium is detachably inserted into the data storage unit, and a sensor head is connected to each of the sensor controller units via an electric code. This makes it possible to perform a first operation of storing image data acquired by the sensor controller from the sensor head and/or measurement data obtained by processing the image data, into the non-volatile record medium of the data storage unit, and/or a second operation of writing the setting data having been stored into the non-volatile record medium of the data storage unit, on a bank memory inside the sensor controller unit.

With such a constitution, in the juxtaposedly placed type sensor system for handling an image, such as a visual sensor or a displacement sensor, it is possible to realize an image data collection function, a bank switch function and the like at low cost by introduction of the minimum required number of new units into an existing system.

Here, the first operation or the second operation may be performed for all the sensor controller units, or part of the sensor controllers which have been previously set. The first operation may be automatically activated with agreement of the measurement data of the sensor controller with prescribed conditions as a trigger. The first operation may be automatically activated for all of the sensor controllers being set at that time, with agreement of the measurement data of one sensor controller with prescribed conditions as a trigger. Further, the second operation may be automatically activated on a bank which corresponds to prescribed conditions, with agreement of the measurement data of the sensor controller with the prescribed conditions as a trigger. Moreover, the first operation may be performed such that data to be stored are grouped while a group is changed to a next one every time a trigger from the external trigger arrives. Furthermore, the first operation may be enabled to be performed with reference to the storage data of the non-volatile record medium.

According to the present invention, only a data storage unit is added to an existing system. Therefore, in the juxtaposedly placed sensor system for handling an image, such as a visual sensor or a disposition sensor, it is possible to realize an image data collection function, a bank switch function and the like at low cost by introduction of the minimum required number of new units into an existing system.

BRIEF DESCRIPTION OF THE DRAWINGS

FIG. 16 shows a view of an example of a printout of a CSV file.

DESCRIPTION OF THE PREFERRED EMBODIMENTS

Figure 1:
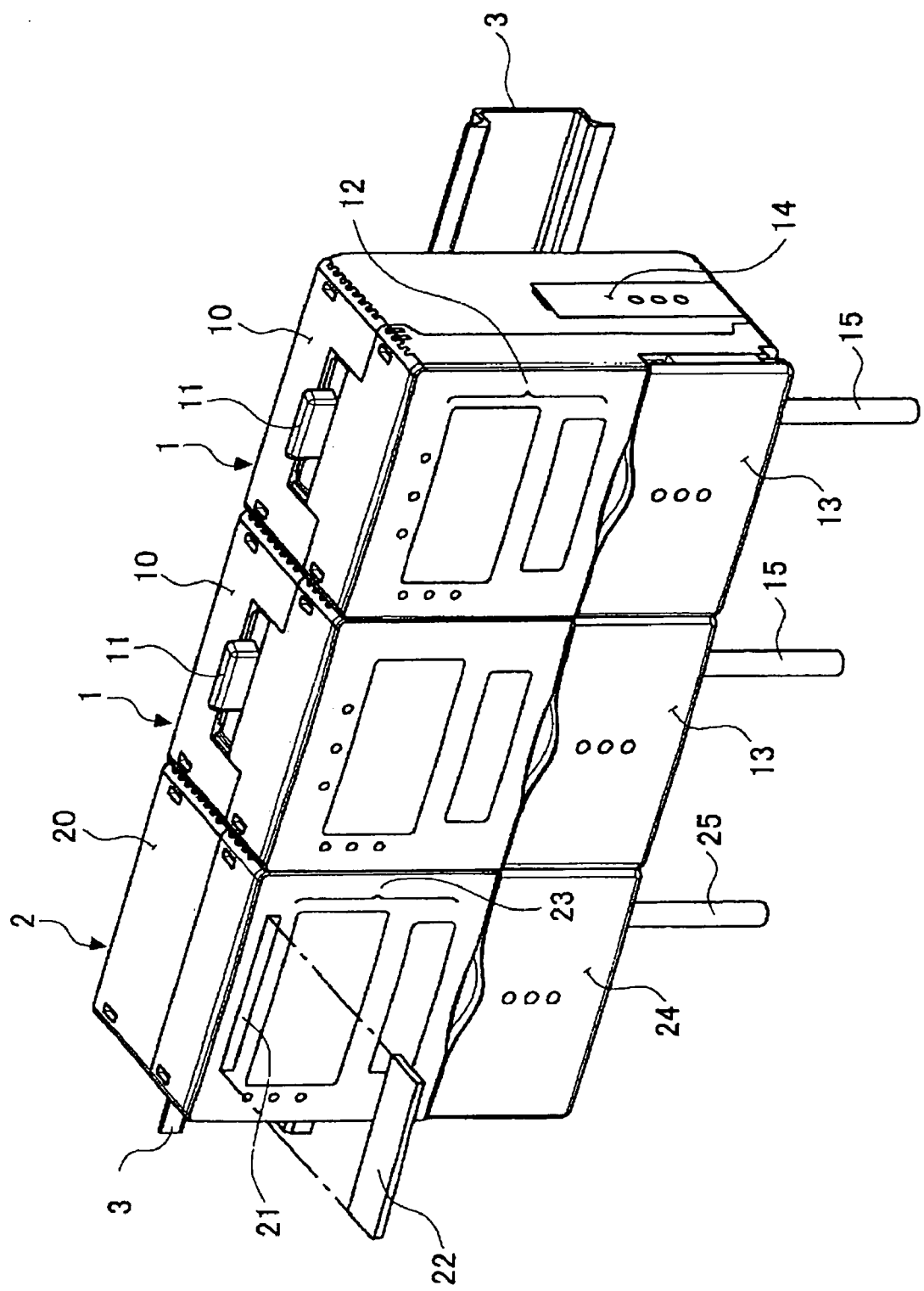
FIG. 1 shows an external oblique view of a sensor system to which the present invention has been applied.

Below, one preferred embodiment of this invention is specifically described with reference to attached drawings. FIG. 1 shows an external oblique view of a sensor system to which the present invention has been applied. As shown in this figure, this sensor system is constituted such that two sensor controller units 1, 1 and one data storage unit 2 are closely juxtaposedly placed to one another via a DIN rail 3. As shown from the figure, a case 10 for the sensor controller unit 1 has almost the same external shape as a case 20 for the data storage unit 2.

The upper face of the case 10 for the sensor controller unit 1 is provided with a sensor connector 11, the front face thereof is provided with a display part 12 and an operational part cover 13, each of the right and left sides thereof is provided with a connector cover 14, and the lower face thereof is provided with an electric code 15. The sensor connector 11 is bonded to a head-side connector provided at the end of a code pulled out from the sensor head, as described later. The operational part cover 13 is freely openable and closable, and a variety of operational keys are arranged inside thereof, as seen when the cover 13 is opened forward while rotated. The connector cover 14 is slidable, and a connector for junction is housed inside thereof, as seen when the cover 14 is opened. The electric code 15 contains a power line, an external control input/output line, and the like.

Meanwhile, the front face of the case 20 for the data storage unit 2 is provided with a card slot 21, a display part 23 and an operational part cover 24. Although not shown in the figure, each of the right and left side faces of the case 20 is provided with a connector cover as in the case of the sensor controller unit 1. Further, an electric code 25 is pulled out from the lower face of the case 20. A Compact Flash (registered trademark) card (thereinafter referred to as CF card) 22 is insertable into a card slot 3. A variety of operational keys are arranged inside an operational part cover 24 as seen when it is opened forward. The electric code 25 contains a power line, an external control input/output line, and the like.

A variety of sensor heads are connected to the sensor connector 11 of the sensor controller unit 1. Those sensor heads include a sensor head for a displacement sensor shown in FIG. 2 and a sensor head for a visual sensor shown in FIG. 3.

Figure 2:
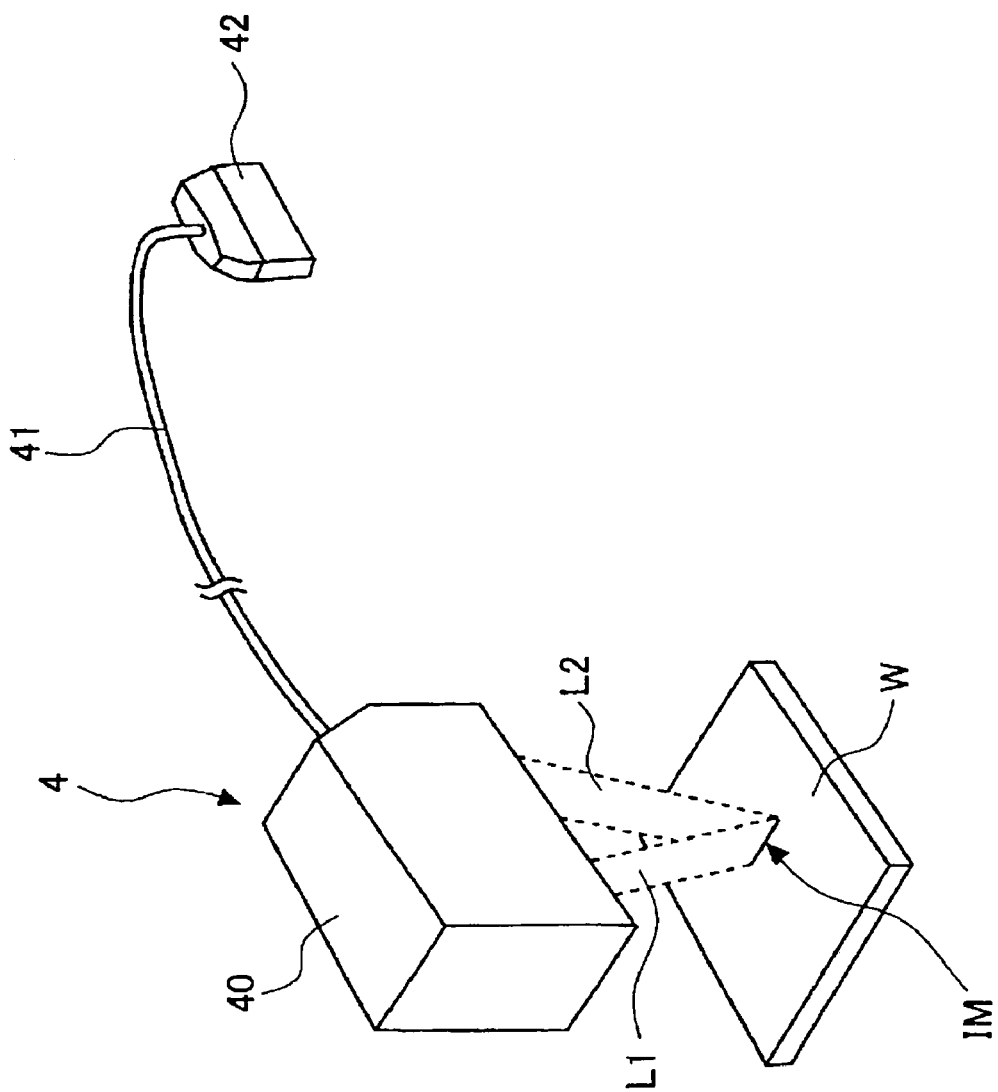
FIG. 2 shows an external oblique view of a sensor head for a displacement sensor.

FIG. 2 shows an external oblique view of a sensor head for a displacement sensor. In this figure, numeral 4 denotes a sensor head, numeral 40 denotes a case for the sensor head, numeral 41 denotes an electric code, numeral 42 denotes a connector, character L1 denotes an irradiated light of a line beam, character L2 denotes a reflected light of the line beam, character IM denotes an optical image of the line beam, and character W denotes a work. The connector 42 provided at the end of the electric code 41 is combined with the connector 11 of the sensor controller unit 1 shown in FIG. 1.

Figure 3:
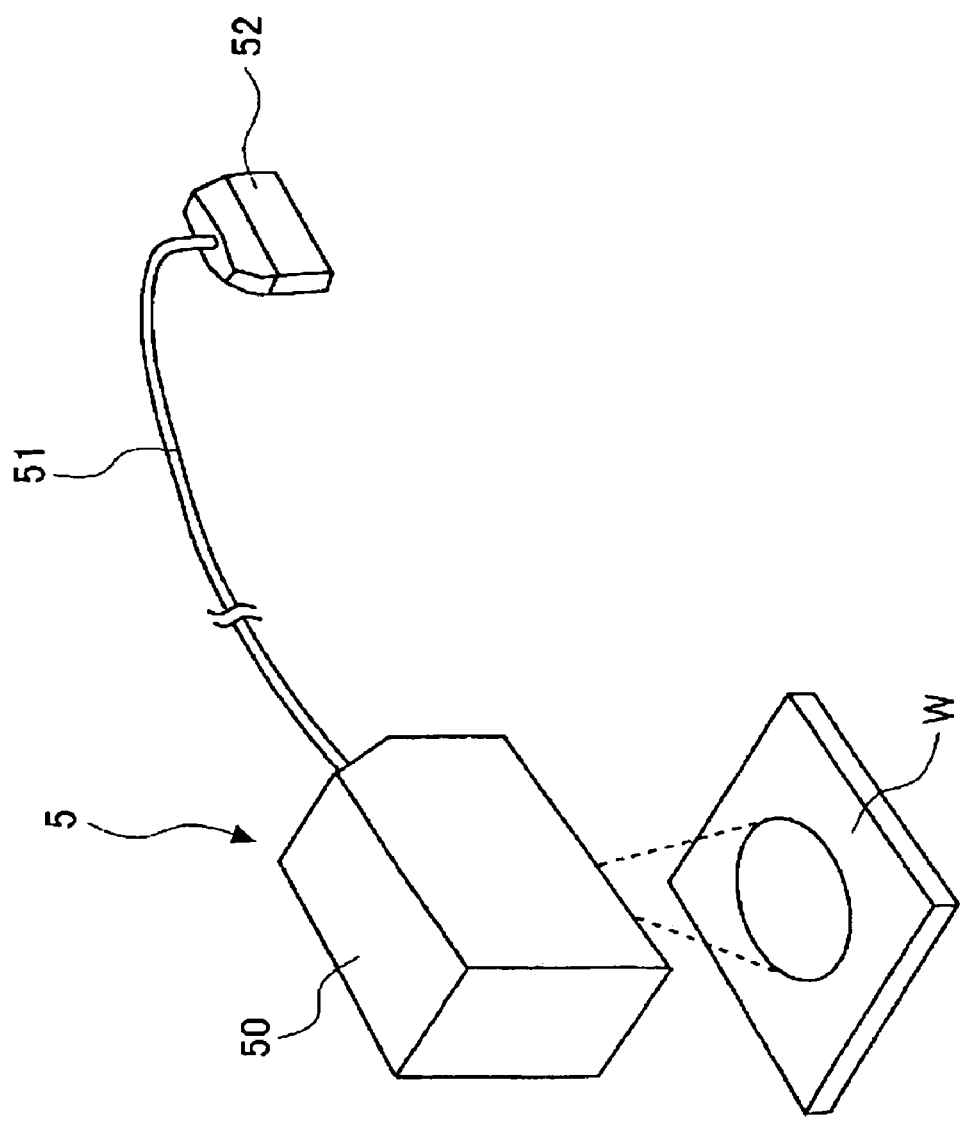
FIG. 3 shows an external oblique view of a sensor head for a visual sensor.

FIG. 3 shows an external oblique view of a sensor head for a visual sensor. In this figure, numeral 5 denotes a sensor head, numeral 50 denotes a case for the sensor head, numeral 51 denotes an electric code, numeral 52 denotes a connector, and character W denotes a work. The case 50 contains an optical system sensor or a two dimensional image sensor for filming the work W. The connector 52 fixed to the end of the electric code 51 is connected with the connector 11 of the sensor controller unit 1 of FIG. 1.

The sensor controller unit 1 performs a measurement process based upon image data transmitted from the sensor head 4 or 5, and then transmits an output signal corresponding to the measurement result to a programmable controller (PLC) or the like via the electric code 15.

As described later, the image data acquired by the sensor controller unit 1 from the sensor head 4 or 5 and/or measurement data obtained by processing the image data are stored into the CF card 22 of the data storage unit 2, and/or setting data stored in the CF card 22 of the data storage unit 2 is written on a bank memory inside the sensor controller unit 1.

With such a constitution, in a juxtaposedly placed type sensor system for handling an image, such as the visual sensor or the displacement sensor, it is possible to realize an image data collection function, a bank switch function and the like at low cost by introduction of the minimum required number of new units (data storage units 2) into an existing system.

Figure 4:
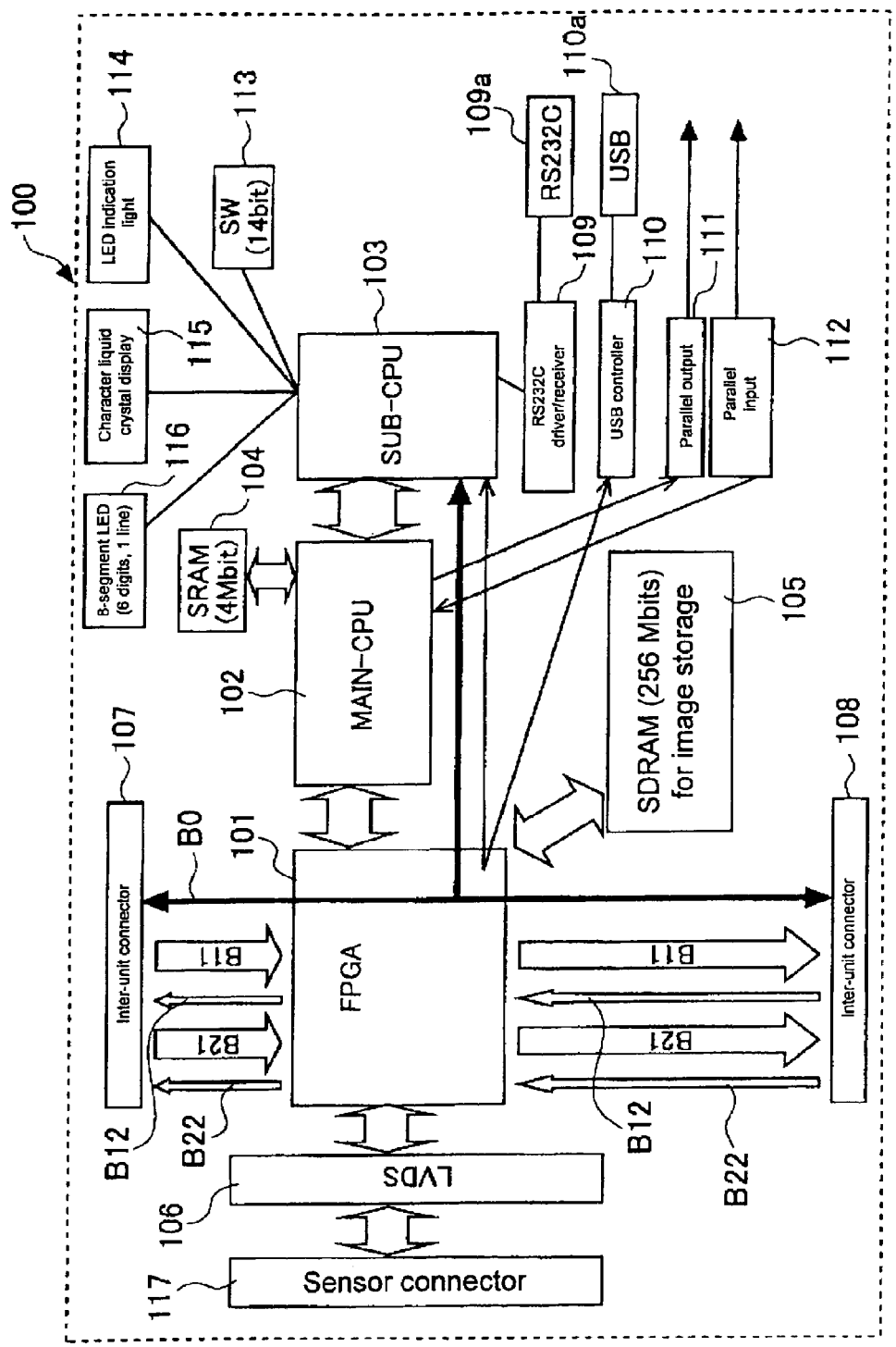
FIG. 4 shows a constitutional view of an electric hardware of a sensor controller unit.

FIG. 4 shows a constitutional view of an electric hardware of a sensor controller unit. In this figure, numeral 100 denotes a circuit part, numeral 101 denotes an FPGA, numeral 102 denotes a main CPU, numeral 103 denotes a sub CPU, numeral 104 denotes an SRAM, numeral 105 denotes an SDRAM (for image storage), numeral 106 denotes an LVDS (ultra high-speed serial controller), numeral 107 denotes a right-side inter-unit connector, numeral 108 denotes a left-side inter-unit connector, numeral 109 denotes an RS232C driver/receiver, character 109a denotes RS232C, numeral 110 denotes a USB controller, character 110a denotes a USB, numeral 111 denotes a parallel output interface, numeral 112 denotes a parallel input interface, numeral 113 denotes a switch input part, numeral 114 denotes an LED indication light, numeral 115 denotes a character liquid crystal display, numeral 116 denotes an 8-segment LED display, and numeral 117 denotes a sensor connector. As apparent from the figure, the circuit part 100 is constituted mainly of the FPGA 101, the main CPU 102 and the sub CPU 103, and also houses an SDRAM (256 bits) 105 for image storage.

Further, a CPU bus B0 is laid between the two inter-unit connectors 107 and 108, and also between the FPGA 101 and the main/sub CPUs 102/103. Further, a first system parallel data bus B11, a first system parallel control bus B12, a second system parallel data bus B21 and a second system parallel control bus B22 are laid between the FPGA 101 and each of the two inter-unit connectors 107/108. As described later, the FPGA 101 appropriately controls connection and disconnection among the bus B0, B11, B12, B21 and B22 so as to secure a route necessary for a variety of control operations.

Figure 5:
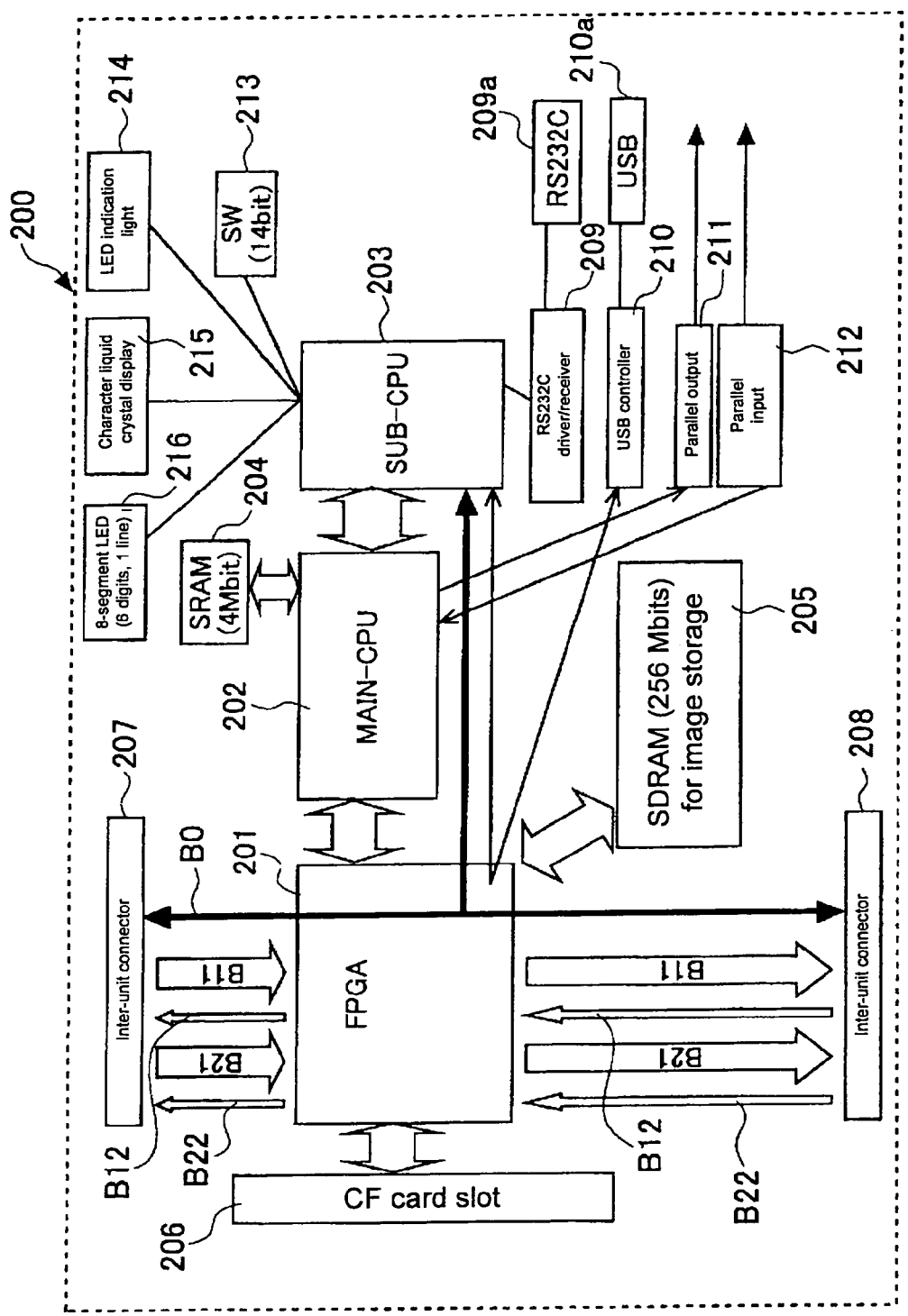
FIG. 5 shows a constitutional view of an electric hardware of a data storage unit.

Next, FIG. 5 shows a constitutional view of an electric hardware of a data storage unit. In this figure, numeral 200 denotes a circuit part, numeral 201 denotes an FPGA, numeral 202 denotes a main CPU, numeral 203 denotes a sub CPU, numeral 204 denotes an SRAM, numeral 205 denotes an SDRAM (for image storage), numeral 206 denotes a CF card slot, numeral 207 denotes a right-side inter-unit connector, numeral 208 denotes a left-side inter-unit connector, numeral 209 denotes an RS232C driver/receiver, character 209a denotes an RS232C, numeral 210 denotes a USB controller, character 210a denotes a USB, numeral 211 denotes a parallel output interface, numeral 212 denotes a parallel input interface, numeral 213 denotes a switch input part, numeral 214 denotes an LED indication light, numeral 215 denotes a character liquid crystal display, and numeral 216 denotes an 8-segment LED display.

As apparent from the figure, the circuit part 200 is also constituted mainly of the FPGA 201, the main CPU 202 and the sub CPU 203, and also houses the variety of buses B0, B11, B12, B21 and B22.

Figure 6:
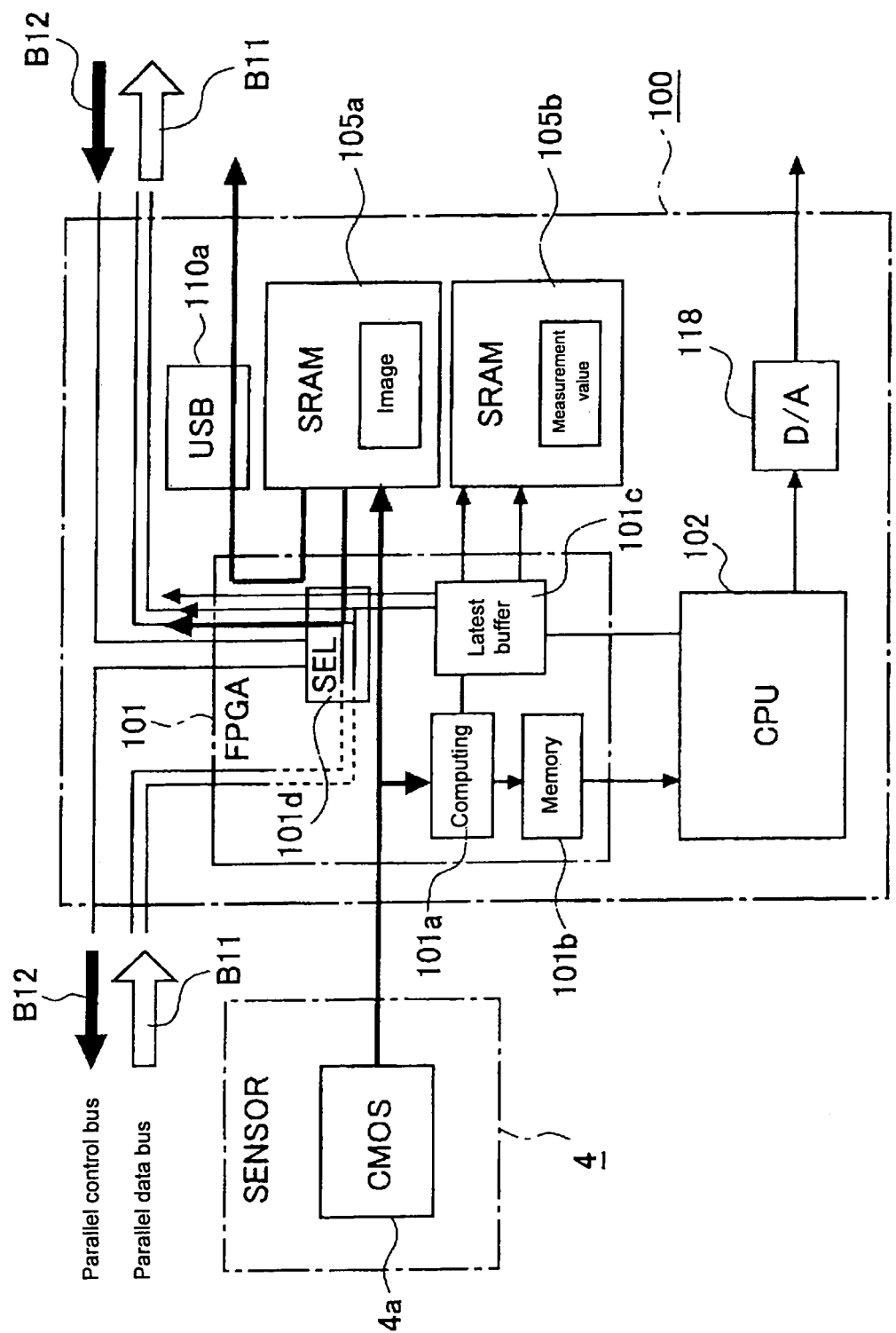
FIG. 6 shows a view of flows of data inside the sensor controller unit.

Next, FIG. 6 shows a view of flows of data inside the sensor controller unit. In this figure, numeral 101 denotes the FPGA, character 101a denotes a computing part, character 101b denotes a memory, character 101c denotes the latest buffer, character 101d denotes a selector, numeral 102 denotes a CPU, character 105a denotes an SRAM for image, character 105b denotes an SRAM for a measurement value, numeral 118 denotes a D/A converter, numeral 100 denotes the circuit part, numeral 4 denotes the sensor head part for the displacement sensor, character 4a denotes a CMOS two dimensional image sensor, character B11 denotes the first system parallel data bus, and character B12 denotes the first system parallel control bus.

As apparent form the figure, image data from the CMOS image sensor 4a inside the sensor head part 4 is constantly transmitted to the SRAM 105a for an image. Simultaneously, this image data is processed via the computing part 101a to obtain a measurement value. The obtained measurement value is stored into the memory 101b while also being stored into the SRAM 105b for a measurement value via the latest buffer 101c. Based upon the measurement value having been stored into the memory 101b, the CPU 102 performs a process following a prescribed measurement category. The obtained process result is outputted to the outside via the D/A converter 118. This CPU 102 simultaneously performs another process of also storing a prescribed processed measurement data, obtained by computing based upon the measurement data having been stored into the memory 101b, into the memory 105b for a measurement value via the latest buffer 101c.

The selector 101d inside the FPGA 101 has a first function of transmitting a self image data and a measurement value data to the parallel data bus B11, and a second function of allowing data, which arrives from the left-side adjacent sensor controller unit via the data bus B11, to pass through the selector 101d itself and then transmitting the data to the right-side adjacent sensor controller unit. Namely, in the case where the selector 101d realizes the first function, data that arrives from the left-side adjacent unit passes through the selector 101d and is then transmitted as it is to the right-side adjacent sensor controller unit via the parallel data bus B11. As opposed to this, in the case where the sensor 101d realizes the second function, data from the left-side adjacent sensor controller unit is shut off, and instead, image data read from the SRAM 105a for an image and the measurement value data having been stored into the latest buffer 101c are allowed to pass through the selector 101d and then transmitted onto the parallel data bus B11 connected to the right-side adjacent sensor controller unit.

Figure 7:
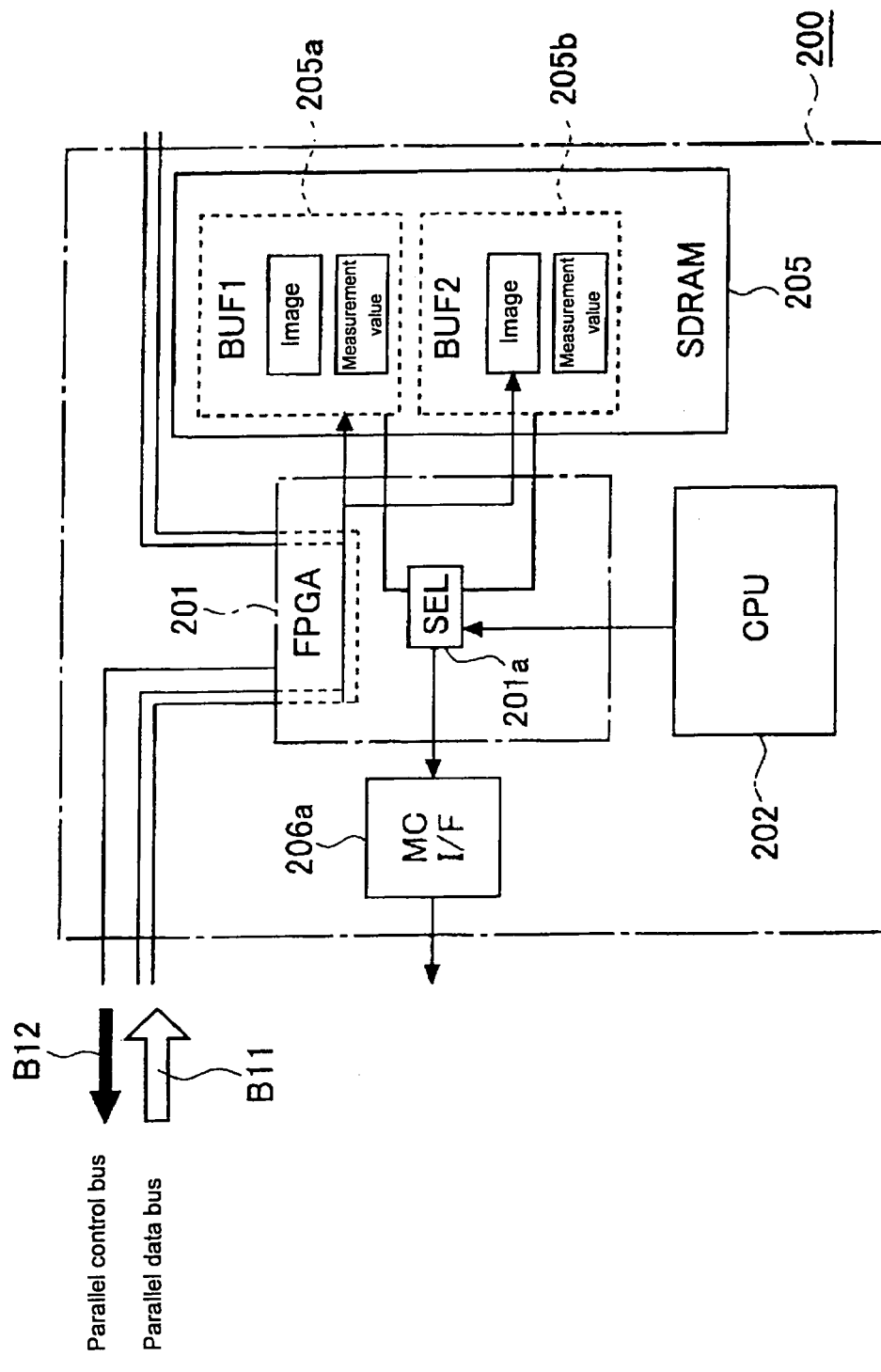
FIG. 7 shows a view of flows of data inside the data storage unit.

Next, FIG. 7 shows a view of flows of data inside the data storage unit. In this figure, numeral 201 denotes the FPGA, character 201a denotes a selector, numeral 202 denotes the CPU, numeral 205 denotes the SDRAM, character 205a denotes a first ring buffer memory for storing an image and a measurement value, character 205b denotes a second ring buffer memory for storing an image and a measurement value similarly to the first ring buffer memory 205a, character 206a denotes a memory card interface for controlling writing and reading on and from the FC card, character B11 denotes the first system parallel data bus, character B12 denotes the first system parallel control bus, and numeral 200 denotes the circuit part.

As apparent from the figure, image data and measurement value data that arrive via the parallel data bus B11 are allowed to pass through the FPGA 201, and then transmitted to the first ring buffer memory 205a and the second ring buffer memory 205b. As opposed to this, since the selector 201a is under control of the CPU 202 and switched to either the first memory 205a or the second memory 205b, the image data and the measurement value data, stored into either selected memory, are allowed to pass through the selector 201a, and then written on a CF card not shown in the figure via the memory controller interface 206a. It should be noted that, although not shown in the figure, the image data and the measurement value data that were stored into the CF card are read via the MC interface 206a on the reverse route, and according to need, the image data and the measurement value data are transmitted to the sensor controller unit side via the first system parallel data bus B11 or the second system parallel data bus B21 which is not shown in the figure.

It should be noted that data each designating a sensor controller unit, for which data is stored, are stored into the memory (SRAM 104) inside the data storage unit. While referring to the data each designating a sensor controller unit, the data storage unit acquires image data and measurement value data from sequentially designated sensor controller units. The data each designating a sensor controller unit, for which data is stored, are created either by setting an identification mark to each of the juxtaposedly placed sensor controller units and then inputting the identification marks with operational keys (SW213), or by displaying identification marks for candidate sensor controller units on the display part 23 to select some identification marks with the operational keys and then storing the selected identification marks as the data. Further, identification marks can also be inputted as data via an input interface such as the parallel input interface 112, the RS232C 109a or the USB 110a. Moreover, it is possible that, whether data is to be stored or not is previously set for each of the juxtaposedly placed sensor controller units, and at the time of storing data, the data storage unit checks whether each object data has been designated or not, and acquires and stores only data of a sensor controller unit for which data is to be stored.

Figure 8:
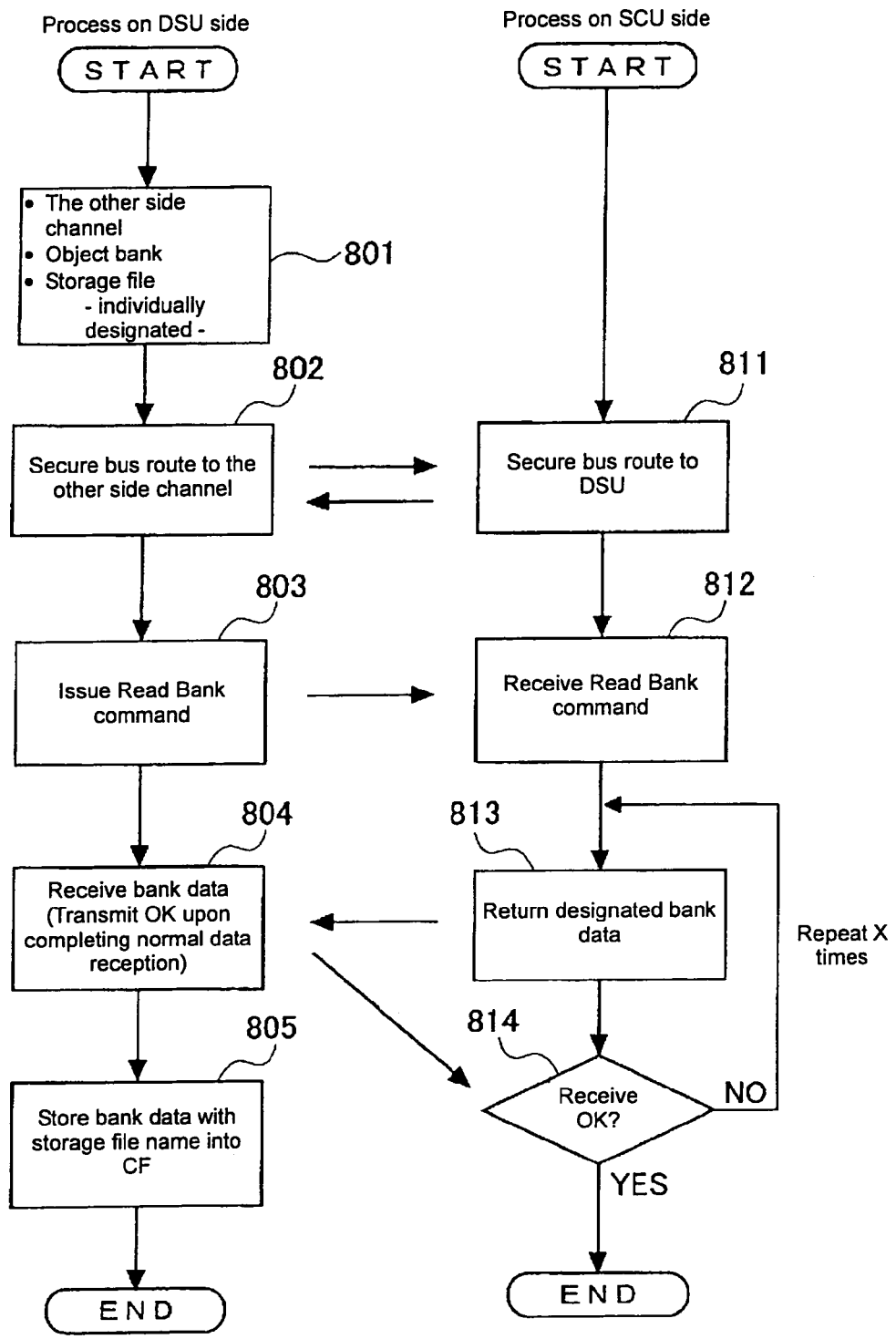
FIG. 8 shows a flowchart of a data storage process from the SCU to a CF card.

Next, FIG. 8 shows a flowchart of a data storage process from the sensor controller unit (hereinafter referred to as CSU) to the CF card. In this figure, when the process is started, "the other side channel", an "object bank" and a "storage file" are individually designated on the DSU side (Step 801). Thereafter, the data storage unit (hereinafter referred to as DSU) side and the CSU side are communicated with one another so as to secure a bus route between the two sides (Steps 802, 811). It should be noted that such securement of the bus route corresponds to the above-described process of switching the selector inside the FPGA, and some other processes.

Subsequently, Read Bank command is first issued from the DSU side (Step 803), and simultaneously, the Read Bank command is received on the SCU side (Step 812). Then, a process for returning a designated bank data is repeated X times on the SCU side (Step 813), and simultaneously, a process for receiving the bank data is performed on the DSU side (Step 804). Upon completing normal reception of data, an OK sign is returned to the CSU side (Step 804). When this OK sign is received on the SCU side (Step 814 YES), the process on the SCU side is completed. Meanwhile, when the received bank data with a storage file name given thereto is stored on the DSU side, the process on the DSU side is completed (Step 805). In such a manner, the data storage process from the SCU to the CF card is completed.

Figure 9:
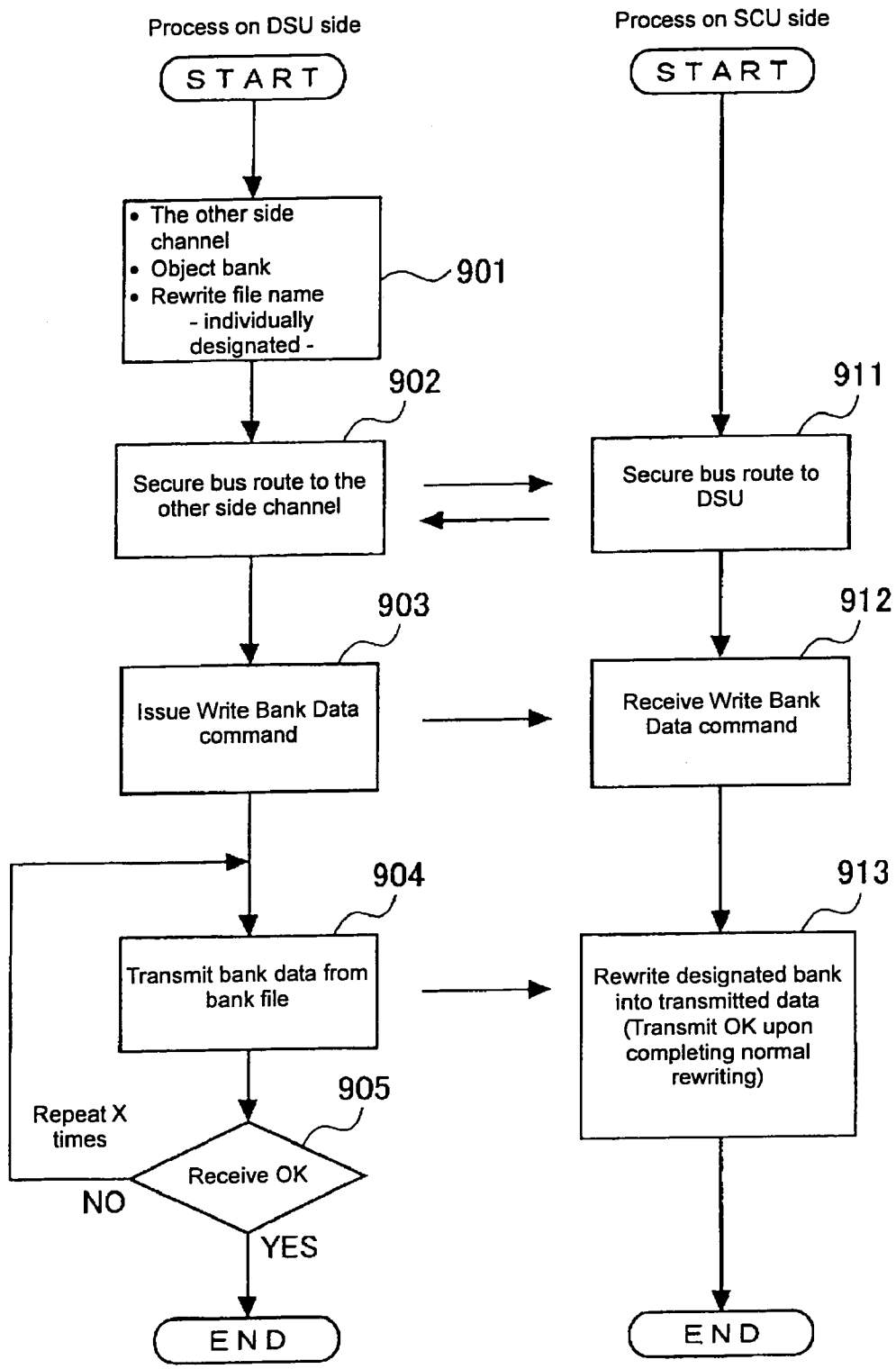
FIG. 9 shows a flowchart of a data rewrite process from the CF to the SCU.

Next, FIG. 9 shows a flowchart of a data rewrite process from the CF card to the SCU. In this figure, when the process is started, "the other-side channel", an "object bank" and a "rewrite file name" are individually designated on the DSU side (Step 901). Subsequently, the DSU side and the SCU side are communicated with one another so as to secure a bus route therebetween (Steps 902, 911). It should be noted that, as above described, such a bus route is also secured by performing the operation of switching the selector inside the FPGA. Then, Write Bank Data command is issued on the DSU side (Step 903), and simultaneously, the Write Bank Data command is received on the SCU side (Step 912). The process of transmitting bank data from a bank file is repeated X times on the DSU side (Step 904), while on the SCU side, the process of rewiring a designated bank into the transmitted data is performed. When this process is normally completed, an OK sign is returned to the DSU side (Step 913). When this OK sign is received on the DSU side (STEP 905 YES), the process on the DSU side is completed. In such a manner, the data rewrite process from the CF card to the SCU is performed.

Figure 10:
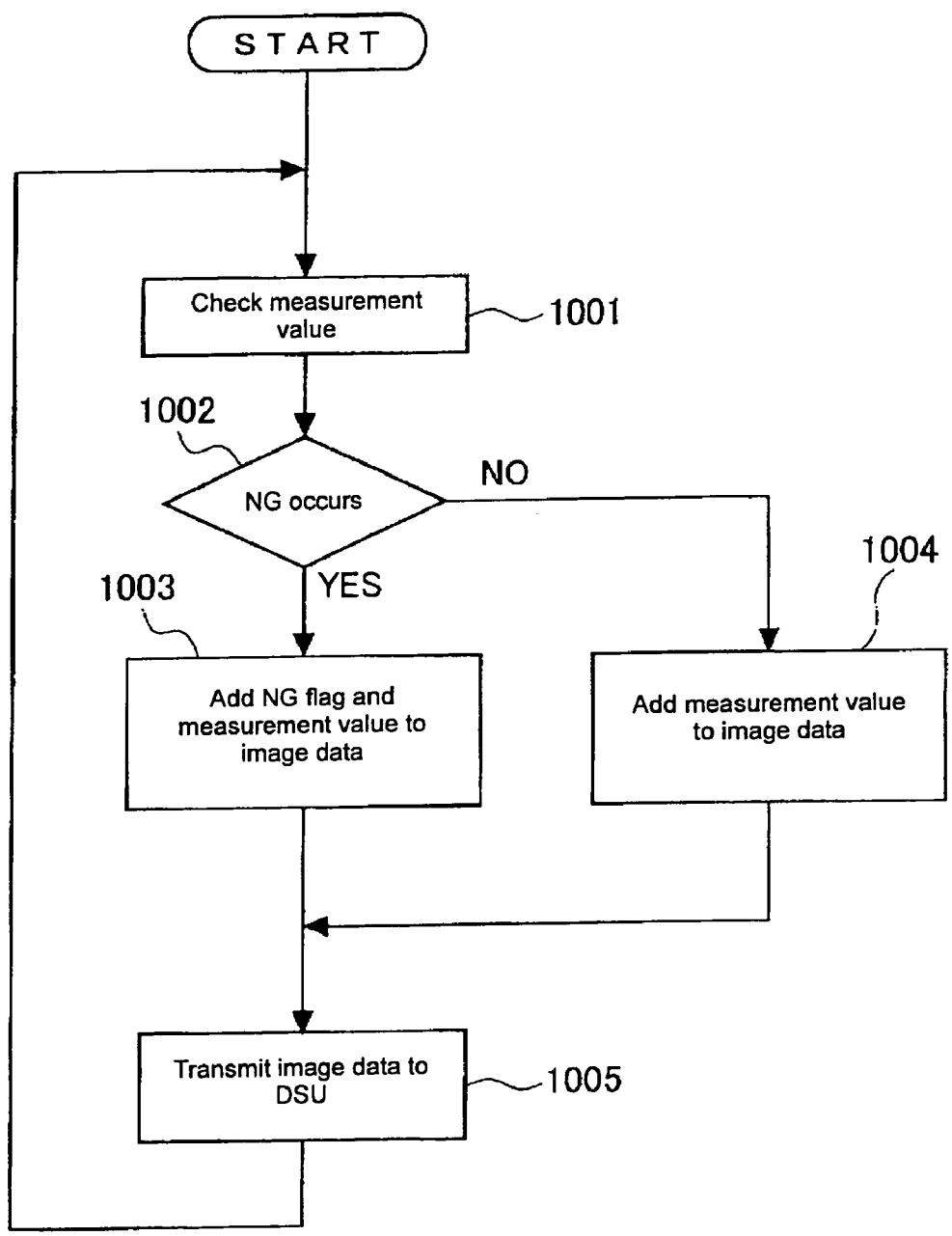
FIG. 10 shows a flowchart of an image data transmission process added with a process for dealing with a state at the time of abnormality on the SCU side.

Next, FIG. 10 shows the detail of an image data transmission process added with a process for dealing with a state at the time of abnormality on SCU side. In this figure, when the process is started, a measurement value obtained by processing image data is checked (Step 1001). As a result of this checking, when NG has not occurred (i.e. in the normal case) (Step 1002), the measurement value is added to the image data (Step 1004), and this data is transmitted to the DSU (Step 1005). The above operation is repeated in a state where no NG has occurred (Steps 1001, 1002, 1004, 1005). As opposed to this, when a measurement value is a value indicating abnormality (Step 1001, 1002 YES), the process of adding an NG flag and the measurement value to image data is performed (Step 1003), and thereafter, the process of transmitting the image data to the DSU is performed (Step 1005). It should be noted that the process in Step 1003 is intended to add the NG flag to the image data, and this process is performed just once immediately after occurrence of NG.

Accordingly, when the SCU side is in the normal state, image data added with a measurement value is continuously transmitted to the DSU side, whereas when NG has occurred, data in the state of having been further added with an NG flag is transmitted.

Figure 11:
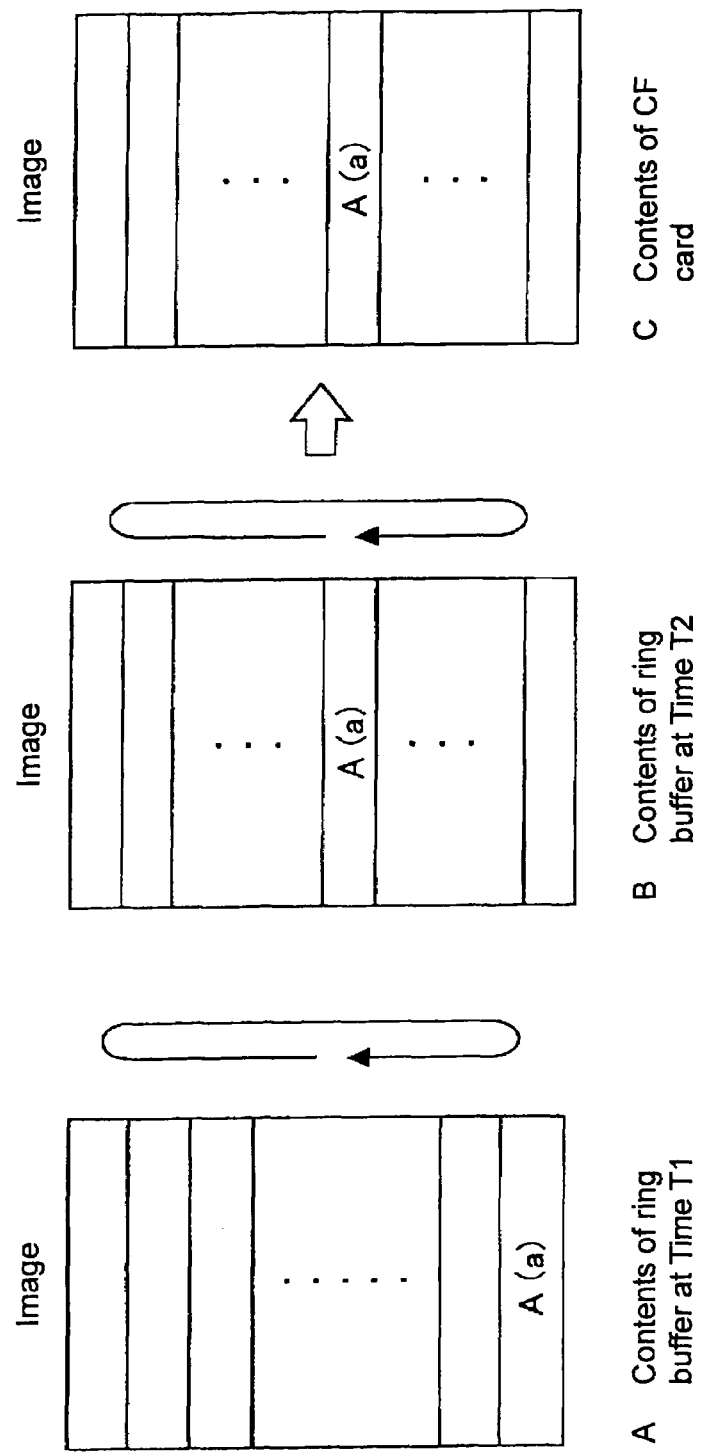
FIG. 11 shows an explanatory view of a process for dealing with a state at the time of abnormality on the DSU side.

FIG. 11 shows an explanatory view of a process for dealing with a state at the time of abnormality on the DSU side. FIG. 11A shows contents of a ring buffer at Time T1. This example illustrates that an image added with an abnormal flag A(a) has been transmitted from the SCU side at Time T1. It should be noted that, as well known by the skilled in the art, the ring buffer serves to realize an FIFO function by circulating/stepping an address for writing. Namely, the ring buffer keeps a certain amount of the latest data stored therein.

When the abnormal flag A(a) arrives as thus described, as shown in FIG. 11B, the arrival of Time T2 is waited, and in a state where a certain amount of image before/after the arrival time of the abnormal flag A(a) is stored, this stored image is stored into the CF card as shown in FIG. 11C. In this manner, on the DSU side, the arrival of an image added with the abnormal flag A(a) is waited on a steady basis. Confirmation of the arrival of the image is waited, and in a definite period of time after the confirmation, the contents of the ring buffer are automatically stored into the CF card. As apparent from the comparison between FIGS. 10 and 11, while merely the process of adding an NG flag is added on the SCU side, merely the presence or absence of the abnormal flag A(a) is confirmed on the DSU side. Hence, time would not be wasted for complicated control. According to this method, when abnormality occurs, image data in accordance with the abnormality can certainly be stored into the CF card. It should be noted that, since this CF card is versatile to be used in a higher-level personal computer and the like, it is possible to insert the CF card into the higher-level personal computer when necessary for reading the contents of the CF card therein so as to accurately analyze the sensing status.

It is to be noted that, upon arrival of the abnormal flag A(a) from one SCU, data each designating an SCU for which data is stored are referred to and only data of the SCU designated by the referred data is stored. If data are to be stored for all of the juxtaposedly placed SCU's, data of all the SCU's are stored. Further, a setting can be made such that the above-described storage operation is performed even when an abnormal flag arrives from any one of the juxtaposedly placed SCU's.

Figure 12:
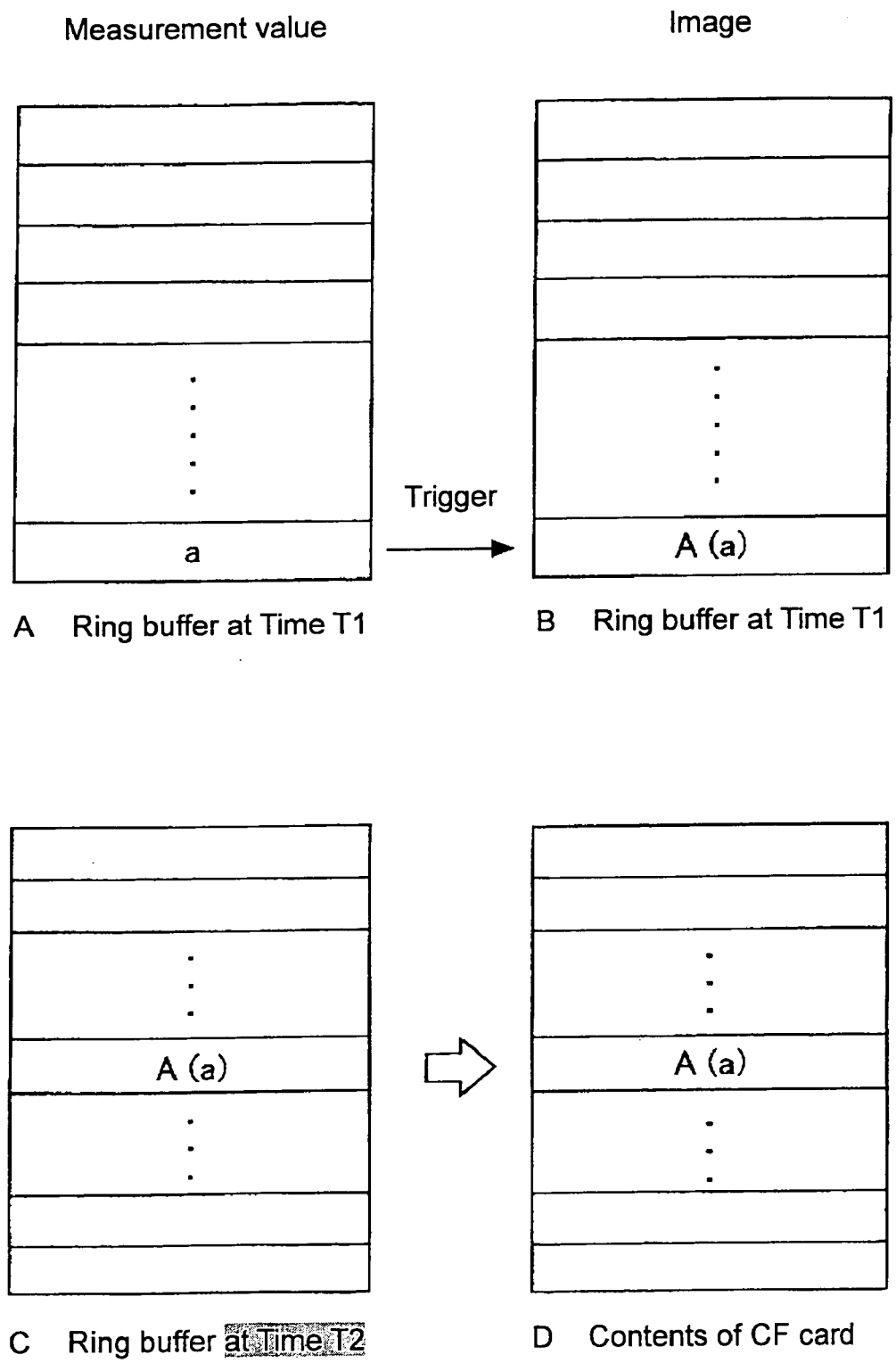
FIG. 12 shows an explanatory view of a process for dealing with a state at the time of abnormality (added with an abnormality determination) on the DSU side.

Next, FIG. 12 shows an explanatory view of a process for dealing with a state at the time of abnormality (added with an abnormality determination) on the DSU side. In this example, the process corresponding to Step 1001 in FIG. 10 is performed on the DSU side to reduce the load on the SCU side. Namely, as shown in FIG. 12A, when abnormality (a) is confirmed as a result of checking a measurement value at Time T1, an abnormal flag A(a) is immediately added to a corresponding image data on the ring buffer as shown in FIG. 12B. The process thereafter is the same as that of FIG. 11. As shown in FIG. 12C, the arrival of the time T2 is waited, and upon the arrival, the contents of the ring buffer are stored into the CF card as shown in FIG. 12D. Also by such a method, it is possible to precisely store an image at the time when a measurement value is a value indicating abnormality, into the CF card.

In the above embodiment, image data and a measurement value are outputted constantly from the SCU to the DSU, and when the measurement value is a value indicating abnormality, the process of further adding an NG flag to the image data is performed. However, another constitution is also possible as a transformed example in which image data and a measurement value are outputted to the DSU only when the measurement value obtained in the SCU is a value indicating abnormality. Namely, on the SCU side, when the NG occurrence is NO as a result of checking a measurement value (Step 1002) in FIG. 10, the process returns to Step 1001 without any process step, instead of going to Step 1004. When the NG occurrence is YES, instead of going to Step 1003, the process goes to a step of further adding identification data of the SCU, the measurement value of which has been detected as abnormal, to image data, and then outputting the image data and the measurement value to the DSU. The reason for performing such a step is as follows. When a plurality of SCU's constantly output data, the DSU can be aware of which SCU has outputted the output data based upon a previously set sequential operation. However, the DSU cannot be aware of such when data is outputted only at the time of abnormality as in this transformed example. The operation in this example can also be realized in such a manner that the DSU sequentially makes inquires to individual SCU's and the SCU's respond to the inquires. In this case, instead of adding identification data in Step 1003, an inquiry from the DSU to the SCU is waited, and when the inquiry is received, image data and a measurement value is outputted to the DSU only when NG occurs. It is to be noted that, in the case of performing the method of adding identification sign data of an SCU to output data, interference occurs in signals when measurement values of a plurality of SCU's are simultaneously observed as abnormal. In preparation for this, a preferential order of SCU's is previously set, and when an SCU with higher priority is outputting data, other SCU's with lower priority are stopped from outputting data. On the other hand, on the DSU side, data is not transmitted from the SCU when the SCU side is in a normal state. Data is transmitted only when NG occurs. The operation of the DSU is thus realized by waiting for data itself to arrive instead of waiting for the abnormal flag A(a) to arrive.

Figure 13:
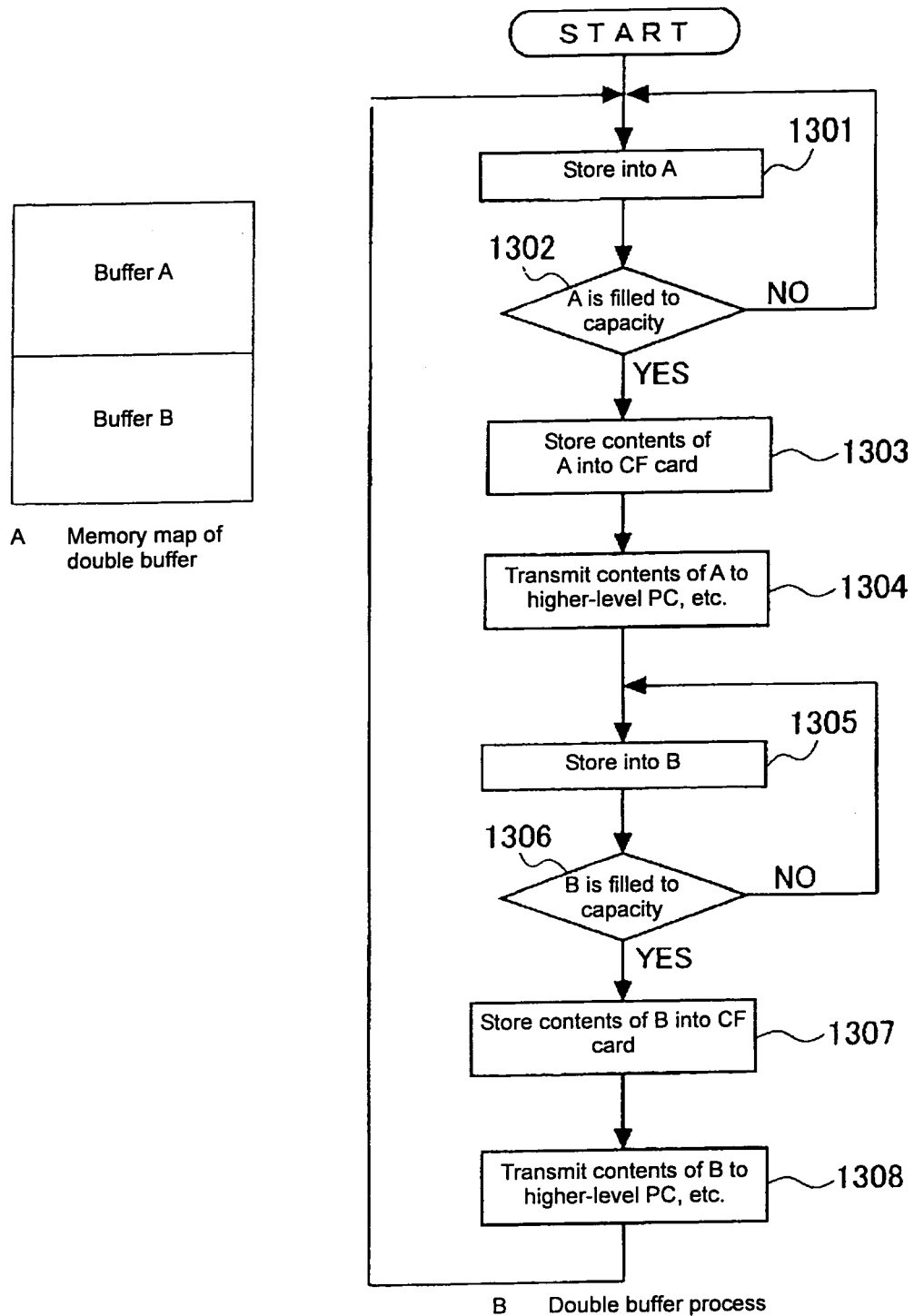
FIG. 13 shows an explanatory view of a double buffer process.

Next, FIG. 13 shows an explanatory view of a double buffer process. This process makes it possible that, while an image and a measurement value are stored into the CF card, the stored image and measurement value themselves are simultaneously read on a screen of a personal computer so as to be referred.

Namely, in this example, a double buffer region consisting of a buffer A and a buffer B is secured on an SRAM, as shown in FIG. 13A. When the process is started, the process of storing data into the buffer A is started (Step 1301). The process waits until the buffer is filled to capacity (Step 1302

YES), and the contents of the buffer A are stored into the CF card (Step 1303). Thereafter, the process of transmitting the contents of the buffer A to the higher-level personal computer or the like is performed (Step 1304). This process enables display of the image data and the measurement value data that are stored in the buffer A on the screen of the higher-level personal computer.

Subsequently, the process of storing data into the buffer B is started (Step 1305). When the buffer B is filled to capacity (Step 1306 YES), the contents of the buffer B are stored into the CF card (Step 1307). Thereafter, the process of transmitting the contents of the buffer B to the higher-level personal computer or the like is performed (Step 1308). This process enables display of the image data and the measurement value data of the buffer B on the screen of the higher-level personal computer. As a result of repeating the above process (Steps 1301 to 1308), in parallel with switching the buffers A and B to one another to store image data and measurement value data therein, the stored data are displayed on the screen of the higher-level personal computer.

Figure 14:
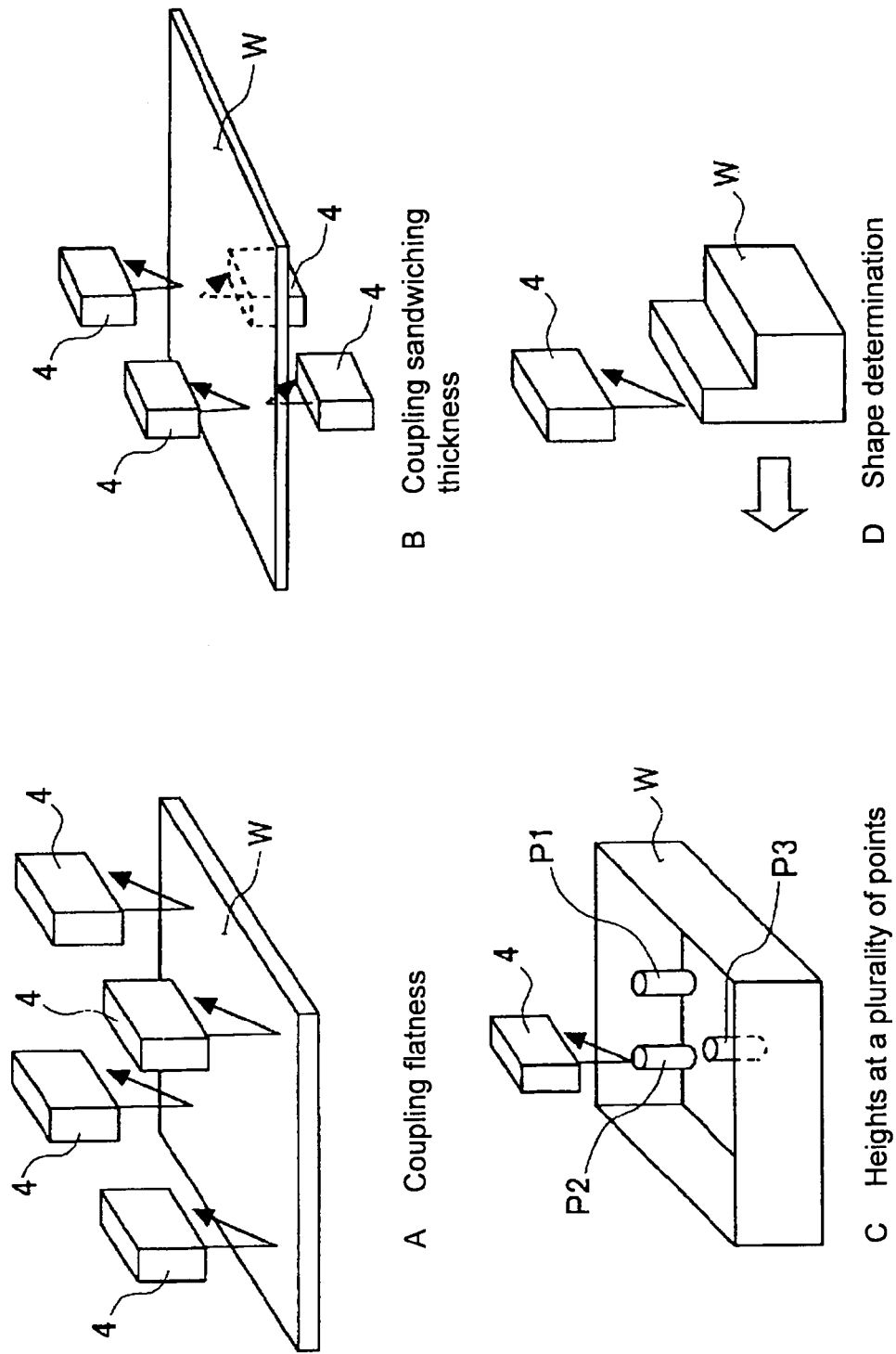
FIG. 14 shows an explanatory view of application examples of the present invention.

FIG. 14 shows an explanatory view of application examples of the present invention. The sensor system of the present invention described above can serve a variety of users' needs. First, a coupling flatness measurement is described with reference to FIG. 14A. For measuring a flatness of a plate-like work W, sensor heads 4, 4 . . . for a displacement sensor are respectively provided at a plurality of points (four points in the figure) above the work, and measurement is performed based upon images and measurement values obtained from those sensor heads 4, 4, . . . Here, it is effective, for later analyzing the state of the work W, to take a measure in which, if a specific one sensor head out of the four sensor heads indicates an abnormal measurement value, images and measurement values of the other three sensor heads are simultaneously stored altogether. This measure is realized in a manner described below. Image data and measurement value data are constantly transmitted individually from the four sensor heads to the DSU side. Meanwhile, on the DSU side, it is constantly determined whether or not one specific sensor head out of the four sensor heads indicates an abnormal measurement value. Only if the one sensor head indicates an abnormal value, storage of image data and measurement value data of the other three sensor heads are started. When a certain amount of the data is stored, that series of data is stored into the CF card as in the above examples. In this manner, it is possible to precisely measure the flatness of the work W based upon the image data (in this example, light images of line beams) obtained from the four sensor heads and the measurement value indicating abnormality.

A coupling sandwiching thickness measurement is described with reference to FIG. 14B. In this example, two sensor heads for a displacement sensor each are provided above and below a plate-like work W. Data on the thickness of the work W being conveyed is intended to be intermittently acquired for as long a period as possible, based upon a difference between measured values of the upper/lower sensor heads. In this case, for example by employing a long-term logging mode (repeated logging), and if a 256 MB CF card is used to store data therein with one second intervals, data can be continuously stored for a year. This allows observation of changes in the work W with time due to the movement thereof along a conveyance path.

A height measurement at a plurality of points is described with reference to FIG. 14C. In this example, when a work W has three measurement points (P1, P2, P3) thereon, those points are intended to be measured with one sensor head 4.

Normally, in this kind of measurement process, when a plurality of such works are successively measured, measurement values of the three points P1 to P3 on those works are successively written in a memory without any break. Thus, where one work changes to the next one in the written measurement value data needs to be consciously figured out when the data is analyzed later. As opposed to this, in the present invention, each of the measurement values of these three points P1 to P3 can be stored as one group, for example into a CSV file, thereby greatly facilitating the later performed analysis operation.

Figure 15:
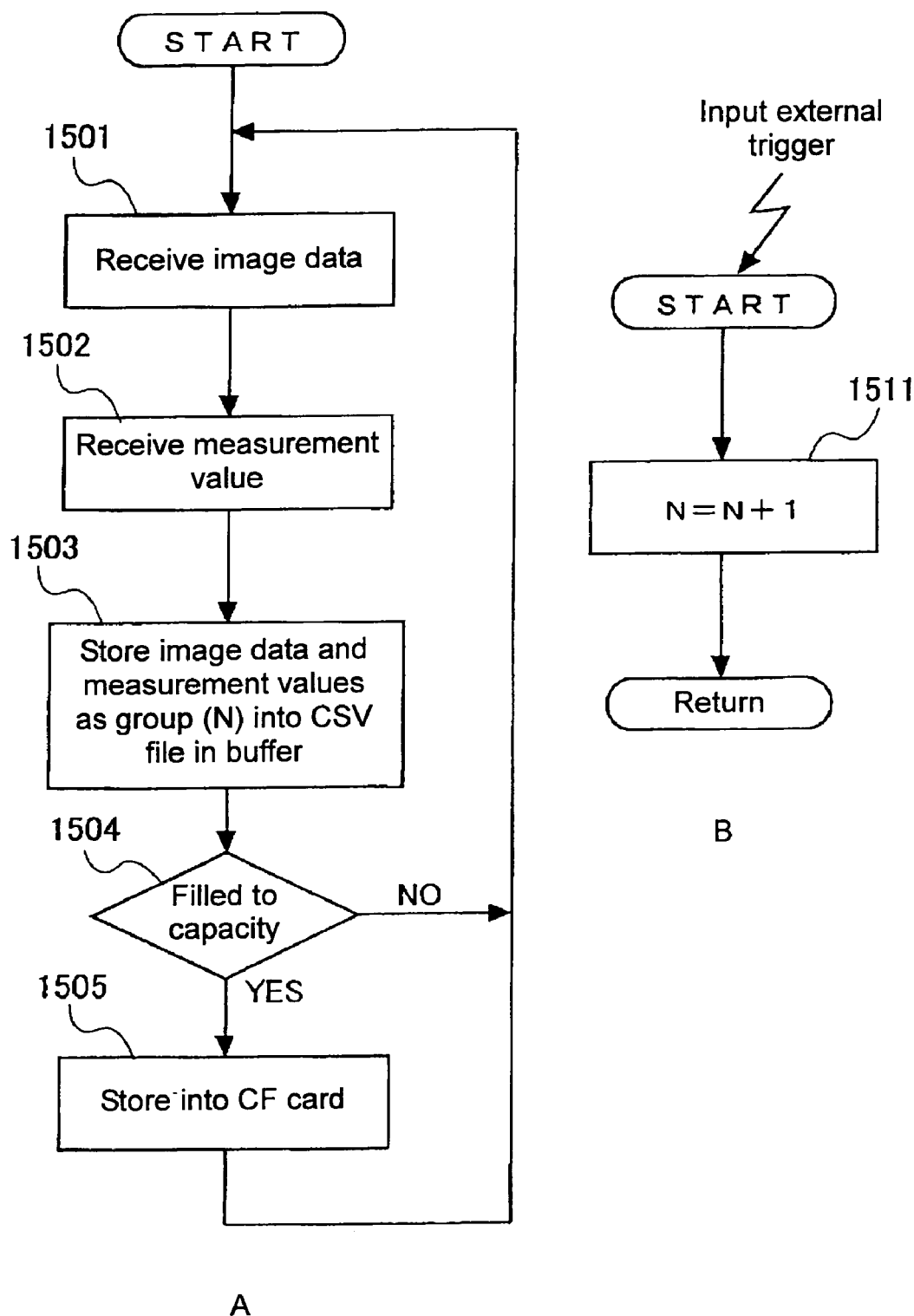
FIG. 15 shows an explanatory view of a linefeed process performed by input of an external trigger.

FIG. 15 shows an explanatory view of a linefeed process performed by input of an external trigger, which is a process for realizing the above-mentioned storage of measurement values. This process includes a data successive storage process shown in FIG. 15A, and an interruption process shown in FIG. 15B. In FIG. 15, when the process is started, image data and measurement values are received (Steps 1501, 1502). Thereafter, the process of storing the image data and the measurement values as a group (N) into a CSV file in a buffer is performed (Step 1503). When the buffer area is filled to capacity after repeatedly performing such a process (Step 1504 YES), the contents of the buffer area are stored into the CF card (Step 1505), and the above-mentioned process (Steps 1501 to 1505) is repeatedly performed.

Meanwhile, as shown in FIG. 15B, when the external trigger input arrives for example from a photoelectric switch which detects a work W, or the like, a value (N) for regulating a group is incremented by 1 (Step 1511). Therefore, every time a new work arrives, the group number (N) is changed by 1. This change is as a result reflected to the process in Step 1503 so that the data of the three points P1 to P3 are stored as one packed group into a CSV file in CF card. For example, when this is printed out, a line is fed for each group consisting of measurement values corresponding to the three points P1 to p3 as shown in FIG. 16, and this printed out data can serve very conveniently in later-described analysis.

Finally, a shape determination process is described with reference to FIG. 14D. There has been a demand for sampling at as high speed as possible in performing this shape determination measurement. In such a case, a high speed logging mode (single logging) is employed, and by simultaneous use of a self start trigger function, it is possible to leave only a required shape.

As apparent from the above descriptions, according to the present invention, only a data storage unit is added to an existing system. Therefore, in a juxtaposedly placed type sensor system for handling an image, such as a visual sensor or a displacement sensor, it is possible to realize an image data collection function, a bank switch function and the like at low cost by introduction of the minimum required number of new units into an existing system.

What is claimed is:

1. A sensor system, wherein
   one data storage unit and one or more than one sensor controller units are detachably juxtaposedly placed, and those units in the juxtaposedly placed state are connected to one another via a parallel data bus,
   a versatile non-volatile record medium is detachably inserted into the data storage unit, and a sensor head is connected to each of the sensor controller units via an electric code,
   the sensor controller outputs image data acquired from the sensor head and/or measurement data obtained by processing the image data, to the data storage unit, and
   the data storage unit stores the image data acquired from the sensor controller, or the measurement data obtained by processing the image data, or the image data acquired from the sensor controller and the measurement data obtained by processing the image data, into the nonvolatile record medium.

2. The sensor system according to claim 1, wherein the storage operation is performed for all the juxtaposedly placed sensor controller units.

3. The sensor system according to claim 1, wherein
data each designating a sensor controller, for which the storage operation is performed, are previously stored altogether into either one data storage unit or one of a plurality of sensor controller units, or dispersedly into more than one of those units, and
the storage operation is performed for the sensor controller designated by the previously stored data.

4. The sensor system according to claim 3, wherein
one sensor controller unit processes image data acquired from the sensor head to determine whether the obtained measurement data is an abnormal value or not, and
when the sensor controller unit determines the measurement data as an abnormal value, the data storage unit performs the storage operation for the sensor controller designated by the previously stored data.

5. The sensor system according to claim 3, wherein
the sensor controller unit outputs a detection signal to the data storage unit by determining the measurement data, obtained by processing image data acquired from the sensor head, as an abnormal value, and
the data storage unit activates the storage operation when acquiring the detection signal from the sensor controller unit.

6. The sensor system according to claim 5, wherein
the sensor controller unit adds the detection signal as data indicating that the detection has been performed, to the image data or to the measurement data, or to the image data and the measurement data, and then outputs the data, and
the data storage unit activates the storage operation when acquiring data corresponding to the detection signal from the sensor controller unit.

7. The sensor system according to claim 1, wherein
at least one sensor controller unit processes image data acquired from the sensor head to determine whether obtained measurement data is an abnormal value or not, and
the data storage unit performs the storage operation when the sensor controller unit determines the measurement data as an abnormal value.

8. The sensor system according to claim 7, wherein
the sensor controller unit outputs a detection signal to the data storage unit by determining the measurement data, obtained by processing image data acquired from the sensor head, as an abnormal value, and
the data storage unit activates the storage operation when acquiring the detection signal from the sensor controller unit.

9. The sensor system according to claim 8, wherein
the sensor controller unit adds the detection signal as data indicating that the detection has been performed, to the image data, or to the measurement data, or to the image data and the measurement data, and then outputs the data, and
the data storage unit activates the storage operation when acquiring data corresponding to the detection signal from the sensor controller unit.

10. The sensor system according to claim 1, wherein
the data storage unit further comprises an external trigger input part, and
image data, acquired between inputting one trigger from the external trigger input part and inputting the next trigger, or measurement data obtained by processing the image data, or the image data, acquired between inputting one trigger from the external trigger input part and inputting the next trigger, and the measurement data obtained by processing the image data, are put together as one group, and the group is changed every time a new trigger is inputted so that the storage operation is performed while data to be stored are grouped.

* * * * *